ary Examiner—Raymond V. Rush
Assistant Examiner—James H. Turnipseed
Attorney, Agent, or Firm—Mason, Kolehmainen, Rathburn & Wyss

[57] ABSTRACT

Pyrimidine derivatives of the general formula:

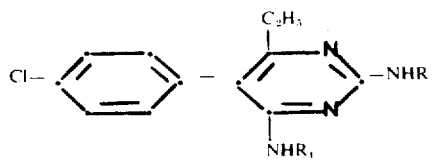

wherein R represents a dipropylacetyl, tripropylacetyl, 2-ethyl-2-butylacetyl or 2-methyl-2-pentyl-acetyl group and $R_1$ represents hydrogen, or a dipropylacetyl, tripropylacetyl, 2-ethyl-2-butyl-acetyl or 2-methyl-2-pentyl-acetyl group. They have useful antiprotozoan, toxoplasmicidal and antiallergenic properties.

5 Claims, No Drawings

PYRIMIDINE DERIVATIVES AND PROCESS FOR PREPARING THE SAME

This invention relates to novel pyrimidine derivatives having pharmacological activity, to pharmaceutical and veterinary compositions containing them, and to a process for preparing the said novel pyrimidine derivatives.

This invention also relates to a method of combating pathological conditions by means of these derivatives.

The novel pyrimidine derivatives with which the invention is concerned can be represented by the general formula:

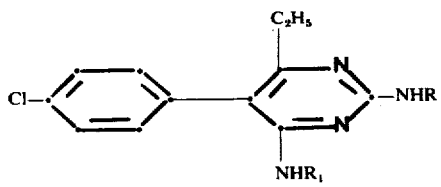

I wherein R represents a dipropylacetyl, tripropylacetyl, 2-ethyl-2-butyl-acetyl or 2-methyl-2-pentyl-acetyl group and $R_1$ represents hydrogen, or a dipropylacetyl, tripropylacetyl, 2-ethyl-2-butyl-acetyl or 2-methyl-2-pentyl-acetyl group.

The pharmaceutically acceptable single (mono) and double (di) acid addition salts of the pyrimidine derivatives represented by formula I are also included within the scope of the present invention.

The compounds of formula I may be prepared by heating, either in the absence of a solvent or in a solvent such as, for example, pyridine and, if required, in the presence of a strong tertiary aliphatic base such as, for example, trimethylamine or triethylamine, 2,4-diamino-5-p-chloro-phenyl-6-ethyl-pryimidine (which has the approved name (B.P.) of Pyrimethamine) of the formula:

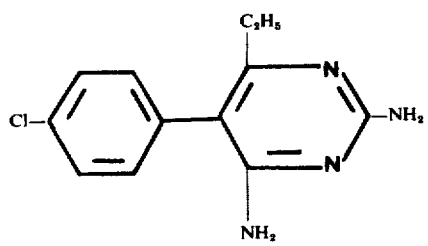

with the appropriate quantity of a compound of the general formula:

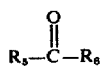

II wherein $R_5$ represents a 2-heptyl, 3-heptyl, 4-heptyl or 4-(4-propyl)-heptyl group and $R_6$ represents a chlorine atom or

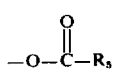

wherein $R_5$ has the same meaning as in formula II, to form the required mono-or di- substituted derivative of formula I in free base form which, if desired, may be reacted with a stoichiometric quantity of an organic or inorganic acid to form a single or double pharmaceutically acceptable acid addition salt thereof.

The quantity of compound II used will be such that 1 or 2 molar equivalents thereof react with 1 molar equivalent of pyrimethamine. During the reaction, there is formed an acid which may be inorganic (when the compound of formula II is an acyl chloride) or organic (when the compound of formula II is an anhydride). This acid can be neutralized in the reaction medium by an excess of pyrimethamine or by a tertiary aliphatic base such as, for example, trimethylamine or triethylamine.

Amongst the compounds represented by formula II, all the chlorides are known as well as the anhydrides in which $R_5$ represents 3-heptyl and 4-heptyl. The anhydrides in which $R_5$ represents 2-heptyl or 4-(4-propyl)-heptyl may be prepared by the method described in Helv. Chim. Acta 45 (1962), 717–737.

In the case of diacylation of pyrimethamine by the dipropylacetyl radical, the 2,4-bis-dipropylacetamido-5-p-chlorophenyl-6-ethyl-pyrimidine obtained presents an allotropy phenomenon. It has, in fact, been observed that the action of dipropylacetic anhydride on pyrimethamine base provides a compound melting at 89°C. when crystallized from pentane. This first allotropic form will be referred to hereinafter as "form W". The existence of other allotropic forms of 2,4-bis-dipropylacetamido-5-p-chlorophenyl-6-ethyl-pyrimidine has been demonstrated by means of various experiments which gave the following results:

(a) "form W" (m.p. 89°C.) when recrystallized from isooctane gives a product which is chemically identical to "form W" but which has a melting point of 113°C. This latter variety is referred to hereinafter as "form X".

b. "form W" when recrystallized from heptane provides "form X".

c. "form W" when recrystallized from pentane or hexane gives "form W".

d. "form X" when recrystallized from hexane gives "form W".

e. "form W" or "form X" when progressively heated to 140°C. until total liquefaction is achieved, and then cooled to 100°C. and maintained for 2 hours at this temperature provides a new allotropic form melting at 121°C. This form will be referred to hereinafter as "form Y".

f. "form X" when dissolved to saturation in white spirit gives, after slow cooling, "form Y" with a melting point of 121°C.

g. "form W" (m.p. 89°C.) and "form X" (m.p. 113°C.) when melted at 140°C. and rapidly cooled each provide an amorphous form, with a glassy appearance, melting at 59°–60°C. This amorphous form will be referred to hereinafter as "form Z".

h. "form Y" (m.p. 121°C.) and "form Z" (m.p. 59°–60°C.) when recrystallized from hexane or isooctane give "form W" and "form X" respectively.

All these varieties are identical in chemical composition. Their spectra when determined on solutions correspond exactly but when determined on the compounds in solid form there are differences.

Study of these different allotropic forms during storage has revealed the following:

a. A slow evolution of "form W" to "form X" which proves that "form W" is not stable.

b. The perfect stability of "form X" as regards aspect, colour, odour, chemical controls (melting point, spectra measurements).

c. The perfect stability of "form Y".

The other diacylated derivatives of pyrimethamine do not appear to present allotropy phenomena.

The compounds of the invention have been found to possess valuable pharmacological properties. In particular the compounds of the invention have been found to possess an antiprotozoan activity which renders them useful in the treatment of various diseases such as malaria, as well as toxoplasmicidal and anti-allergenic properties.

With regard to the treatment, both preventive and curative, of malaria the most successful and widely used agent known to date is pyrimethamine. However, in most malaria-infested regions, the use of pyrimethamine has been abandoned because of the undesirable side-effects caused by this substance when administered in therapeutic doses over prolonged periods. These side-effects may be haematological in character leading, for example, to such affections as leucopenia, or take the form of digestive disorders and even renal damage.

The results of the various tests carried out with the compounds of the invention indicate that the latter do not present these disadvantages, while at the same time they exert a therapeutic effect which is at least equivalent to that of pyrimethamine.

Acute toxicity tests were carried out with compounds of the invention in accordance with the technique of Litchfield and Wilcoxon (J. Pharmacol., 1949, 95, 99). The tests were performed on adult mice of the Swiss strain weighing between 20 and 30 g. The animals were divided into groups of 50 and the compound under study was administered, either intraperitoneally or orally, to successive groups in such a way that each group received a higher dose than that given to the preceding group. The purpose of the test was to establish the $LD_{50}$ or minimum dose required to kill 50% of the experimental animals. The reference substance chosen was pyrimethamine.

It was, however, found that while the $LD_{50}$ could be determined for pyrimethamine, the compounds of the invention were so lacking in toxicity that no lethal dose at all could be established. For the compounds of the invention, the limiting factor was the amount of product which the animals were physically capable of absorbing either by intraperitoneal or by oral route. This latter dose, which failed to kill any of the animals, is hereinafter referred to as the maximum tolerated dose (MTD) i.e. the maximum quantity of product that the animal was physically capable of accepting. This dose can also be referred to as the $LD_0$, i.e. the highest dose that the animals can receive without any deaths occurring. However, for the purposes of the present text the abbreviation MTD will be used.

Under these circumstances, the following results were registered:

For pyrimethamine, the $LD_{50}$ by intraperitoneal route was on the average 74 mg./kg. and by oral route 128 mg./kg.

With the two preferred compounds of the invention, namely: 2-dipropylacetamido-4-amino-5-p-chlorophenyl-6-ethyl-pyrimidine (hereinafter referred to as B 8270) and 2,4-bis-dipropylacetamido-5-p-chlorophenyl-6-ethyl-pyrimidine (hereinafter referred to as B 8370) it was found that the MTD by intraperitoneal route for both B 8270 and B 8370 exceeded 1500 mg./kg. while the MTD by oral route for these two compounds exceeded 3000 mg./kg.

The same MTD's were registered for both B 8270 and B 8370 in toxicity tests on chicks by intraperitoneal route while an intraperitoneal dose of 75 mg./kg. of pyrimethamine killed 60% of the chicks.

As regards antiprotozoan activity, tests were first performed on mice in order to determine activity against plasmodium Berghei. The animals were artificially infected by the intraperitoneal route by means of a suspension in an isotonic solution of sodium chloride of 5 × $10^6$ parasite-bearing red cells taken from animals infected 5 days previously.

The disease thus provoked developed as follows when untreated:

1. Prehaematological Phase

Parasites appeared in the blood 48 hours after inoculation with the parasite-bearing red cell suspension. During this prehaematological phase, the ribonuclease activity of the plasma increased and the parasites acted selectively on the reticulocytes which were then converted to acidophilic erythrocytes. There was therefore a drop in the number of reticulocytes as compared with the initial level.

2. Haematological Phase

During this phase, the parasite could be easily discerned by means of smears on a slide stained with May Grunwald Giemsa Stain or brilliant cresyl purple or a mixture of the two.

The level of parasites in the blood increased until the animals died. At this point, it was observed that there was anaemia going as far as an erythrocytes count of 1.5 × $10^6$.

3. Phase of Full Development of the Disease

This phase commenced on the sixth day after inoculation. There was progressive loss of weight, accompanied by apathy, while the hair stood on end and the ears and then the eyes became discoloured.

4. Terminal Phase

This phase commenced on the eight day after inoculation. The mice were completely discoloured, their heads hung down between their front paws while the back-bone stood out. They refused all food and drink and their hindquarters were paralysed. Dyspnoea appeared together with convulsions and hypothermia followed by death.

At the end of 15 days all the animals were dead.

In the test performed, the two preferred compounds of the invention, namely B 8270 and B 8370, were compared to pyrimethamine.

The following experimental conditions were observed:

The mice were divided into batches of 10.

The control animals were inoculated with the parasite-bearing suspension but received no treatment.

In preventive treatment, the compound under study was given 24 hours after inoculation.

In curative treatment, the compound under study was given 4 days after inoculation.

Development of the disease was studied by means of stained smears made on the day following inoculation, and then on the average every two days for a week and afterwards once a week for at least a month.

The compounds under study were administered on 6 consecutive days.

The mice were considered as cleared of the parasite when 50 successive microscopical examinations of smears had given negative results and when inoculation with their blood failed to transmit the disease to fresh mice.

The product under study was considered to be active when it prolonged the survival of half the treated animals by at least 15 days after the death of the last control animal. The dose which achieved this result is referred to hereinafter as the Effective Dose 50 or $ED_{50}$. Dosage of the three compounds used in the test was calculated so as to contain an equimolecular quantity of pyrimethamine base.

The results obtained in these tests are given in the following Tables I, II, III and IV.

TABLE I

Preventive Treatment by Intraperitoneal Route

| Number of days after inoculation | Controls | | Pyrimethamine (Base) | | | | B 8270 | | | | B 8370 | | | |
|---|---|---|---|---|---|---|---|---|---|---|---|---|---|---|
| | | | 0.25 mg./kg. | | 0.50 mg./kg. | | 0.37 mg./kg. | | 0.75 mg./kg. | | 0.50 mg./kg. | | 1 mg./kg. | |
| | I | D | I | D | I | D | I | D | I | D | I | D | I | D |
| 5 | 7/10 | 0/10 | 0 | 0 | 0 | 0 | 0 | 0 | 0 | 0 | 0 | 0 | 0 | 0 |
| 7 | 7/7 | 3/10 | 0 | 0 | 0 | 0 | 0 | 0 | 0 | 0 | 0 | 0 | 0 | 0 |
| 8 | 4/4 | 6/10 | 0 | 0 | 0 | 0 | 0 | 0 | 0 | 0 | 0 | 0 | 0 | 0 |
| 9 | 3/3 | 7/10 | 0 | 0 | 0 | 0 | 3/10 | 0 | 0 | 0 | 0 | 0 | 0 | 0 |
| 10 | 3/3 | 7/10 | 0 | 0 | 0 | 0 | 7/10 | 0 | 0 | 0 | 0 | 0 | 0 | 0 |
| 13 | | 10/10 | 3/10 | 1/10 | 0 | 0 | 5/10 | 0 | 0 | 0 | 0 | 0 | 0 | 0 |
| 16 | | | 3/9 | 1/10 | 0 | 0 | 2/10 | 0 | 0 | 0 | 0 | 0 | 0 | 0 |
| 19 | | | 4/8 | 2/10 | 0 | 0 | 0 | 0 | 0 | 0 | 0 | 0 | 0 | 0 |
| 22 | | | 6/8 | 2/10 | 0 | 0 | 0 | 0 | 0 | 0 | 0 | 0 | 0 | 0 |
| 27 | | | 8/8 | 2/10 | 0 | 0 | 0 | 0 | 0 | 0 | 0 | 0 | 0 | 0 |
| 30 | | | 8/8 | 2/10 | 0 | 0 | 0 | 0 | 0 | 0 | 0 | 0 | 0 | 0 |
| 36 | | | 8/8 | 2/10 | 0 | 0 | 0 | 0 | 0 | 0 | 0 | 0 | 0 | 0 |
| 40 | | | 8/8 | 2/10 | 0 | 0 | 0 | 0 | 0 | 0 | 0 | 0 | 0 | 0 |

I = infected
D = dead

Equimolecular doses of pyrimethamine base
B 8270  0.37 = 0.25 mg./kg.; 0.75 = 0.50 mg./kg.
B 8370  0.50 = 0.25 mg./kg.; 1 mg = 0.50 mg./kg.

TABLE II

Curative Treatment by Intraperitoneal Route

| Number of days after inoculation | Controls | | Pyrimethamine (base) | | | | B 8270 | | | | B 8370 | | | |
|---|---|---|---|---|---|---|---|---|---|---|---|---|---|---|
| | | | 0.25 mg./kg. | | 0.50 mg./kg. | | 0.37 mg./kg. | | 0.75 mg./kg. | | 0.50 mg./kg. | | 1 mg./kg. | |
| | I | D | I | D | I | D | I | D | I | D | I | D | I | D |
| 5 | 10/10 | 0 | 10/10 | 0 | 10/10 | 0 | 10/10 | 0 | 10/10 | 0 | 10/10 | 0 | 10/10 | 0 |
| 8 | 7/7 | 3/10 | 7/10 | 0 | 6/10 | 0 | 8/10 | 0 | 7/10 | 0 | 6/10 | 0 | 3/10 | 0 |
| 10 | 6/6 | 4/10 | 7/10 | 0 | 1/10 | 0 | 8/10 | 0 | 6/10 | 0 | 1/10 | 0 | 0 | 0 |
| 15 | | 10/10 | 7/9 | 1/10 | 0 | 0 | 8/10 | 0 | 3/10 | 0 | 0 | 0 | 0 | 0 |
| 18 | | | 5/7 | 3/10 | 0 | 0 | 7/8 | 2/10 | 1/10 | 0 | 0 | 0 | 0 | 0 |
| 22 | | | 5/7 | 3/10 | 0 | 0 | 7/8 | 2/10 | 0 | 0 | 0 | 0 | 0 | 0 |
| 27 | | | 3/6 | 4/10 | 0 | 0 | 6/7 | 3/10 | 0 | 0 | 0 | 0 | 0 | 0 |
| 30 | | | 3/6 | 4/10 | 0 | 0 | 6/6 | 4/10 | 0 | 0 | 0 | 0 | 0 | 0 |
| 31 | | | 3/4 | 6/10 | 0 | 0 | 5/6 | 4/10 | 0 | 0 | 0 | 0 | 0 | 0 |
| 32 | | | 1/3 | 7/10 | 0 | 0 | 3/5 | 5/10 | 0 | 0 | 0 | 0 | 0 | 0 |
| 38 | | | 1/3 | 7/10 | 0 | 0 | 3/5 | 5/10 | 0 | 0 | 0 | 0 | 0 | 0 |
| 40 | | | 1/3 | 7/10 | 0 | 0 | 3/5 | 5/10 | 0 | 0 | 0 | 0 | 0 | 0 |

Equimolecular doses of pyrimethamine base - same as for Table I

TABLE III

Preventive Treatment by Oral Route

| Number of days after inoculation | Controls | | Pyrimethamine (base) | | | | B 8270 | | | | B 8370 | | | |
|---|---|---|---|---|---|---|---|---|---|---|---|---|---|---|
| | | | 1 mg./kg. | | 2.5 mg./kg. | | 1.5 mg./kg. | | 3.75 mg./kg. | | 2 mg./kg. | | 5 mg./kg. | |
| | I | D | I | D | I | D | I | D | I | D | I | D | I | D |
| 3 | 10/10 | 0 | 2/10 | 0 | 0 | 0 | 1/10 | 0 | 0 | 0 | 0 | 0 | 0 | 0 |
| 8 | 10/10 | 0 | 2/10 | 0 | 0 | 0 | 2/10 | 0 | 0 | 0 | 0 | 0 | 0 | 0 |
| 10 | 9/9 | 1/10 | 2/10 | 0 | 0 | 0 | 2/10 | 0 | 0 | 0 | 0 | 0 | 0 | 0 |
| 11 | 3/3 | 7/10 | 1/9 | 1/10 | 0 | 0 | 2/10 | 0 | 0 | 0 | 0 | 0 | 0 | 0 |
| 12 | | 10/10 | 1/9 | 1/10 | 0 | 0 | 2/10 | 0 | 0 | 0 | 0 | 0 | 0 | 0 |
| 20 | | | 1/9 | 1/10 | 0 | 0 | 2/10 | 0 | 0 | 0 | 0 | 0 | 0 | 0 |
| 55 | | | 0 | 2/10 | 0 | 0 | 0 | 2/10 | 0 | 0 | 0 | 0 | 0 | 0 |
| 60 | | | 0 | 2/10 | 0 | 0 | 0 | 2/10 | 0 | 0 | 0 | 0 | 0 | 0 |

Intraperitoneal : B 8270 1.5 = 1 mg./kg.; 3.75 = 2.5 mg./kg. of pyrimethamine base
Oral : B 8370 2 = 1 mg./kg.; 5 = 2.5 mg./kg. of pyrimethamine base

TABLE IV

| Number of days after inoculation | Controls | | Curative Treatment by Oral Route | | | | | | | | | |
|---|---|---|---|---|---|---|---|---|---|---|---|---|
| | | | Pyrimethamine (Base) | | | | B 8270 | | | | B 8370 | |
| | | | 1 mg./kg. | | 2.5 mg./kg. | | 1.5 mg./kg. | | 3.75 mg./kg. | | 2 mg./kg. | | 5 mg./kg. |
| | I | D | I | D | I | D | I | D | I | D | I | D | I | D |
| 8 | 4/4 | 6/10 | 0 | 0 | 0 | 0 | 0 | 0 | 0 | 0 | 0 | 0 | 0 | 0 |
| 9 | 1/1 | 9/10 | 0 | 0 | 0 | 0 | 0 | 0 | 0 | 0 | 0 | 0 | 0 | 0 |
| 9 | 1/1 | 9/10 | 0 | 0 | 0 | 0 | 0 | 0 | 0 | 0 | 0 | 0 | 0 | 0 |
| 11 | | 10/10 | 0 | 0 | 0 | 0 | 0 | 0 | 0 | 0 | 0 | 0 | 0 | 0 |
| 21 | | | 0 | 0 | 0 | 0 | 0 | 1/10 | 0 | 0 | 0 | 0 | 0 | 0 |
| 22 | | | 0 | 0 | 0 | 1/10 | 0 | 1/10 | 0 | 0 | 0 | 0 | 0 | 0 |
| 27 | | | 1/7 | 3/10 | 0 | 1/10 | 5/7 | 3/10 | 0 | 0 | 2/10 | 0 | 0 | 0 |
| 33 | | | 1/7 | 3/10 | 0 | 1/10 | 4/5 | 5/10 | 0 | 0 | 1/9 | 1/10 | 0 | 0 |
| 47 | | | 2/6 | 4/10 | 0 | 1/10 | 3/5 | 5/10 | 0 | 0 | 0 | 2/10 | 0 | 0 |
| 57 | | | 2/6 | 6/10 | 0 | 1/10 | 0/5 | 5/10 | 0 | 0 | 0 | 2/10 | 0 | 0 |

Equimolecular doses of pyrimethamine base - same as for Table III

From the results thus obtained the Activity Index of each compound studied may be determined. The Activity Index is calculated by dividing the $LD_{50}$ (or, in the case of the compounds of the invention, the MTD since the compounds are insufficiently toxic for a $LD_{50}$ to be determined) by the $ED_{50}$ or Effective Dose 50, i.e.

$$\frac{LD_{50} \text{ (or MTD)}}{ED_{50}}$$

The comparative results according to this calculation are as follows:

| | Intraperitoneal | Oral |
|---|---|---|
| Pyrimethamine | $\frac{74}{0.50} = 148$ | $\frac{128}{1} = 128$ |
| B 8270 | $> \frac{1500}{1} = > 1500$ | $> \frac{3000}{1} = > 3000$ |
| B 8370 | $> \frac{1500}{0.50} = > 3000$ | $> \frac{3000}{1.5} = > 2000$ |

These figures show that the $ED_{50}$ of the three compounds cited are comparable with each other with a slight advantage in favour of B 8370. However, the Activity Indices are markedly favourable to B 8270 and b 8370 by reason of the exceptionally low toxicity of these latter compounds.

A further series of antiprotozoan tests were carried out in order to determine the activity of the compounds of the invention against plasmodium gallineaceum.

In these tests the experimental disease was provoked in 15-day chicks by an intramuscular injection of blood taken from a chick at peak infection (tenth day).

From the tenth/twelth day after the injection, 40% to 50% of the chicks die after which the parasite-level in the blood of the survivors drops. Between the twenty-fifth and thirtieth day there is a new fatal attack. Finally, about 30% of the parasitized chicks survive.

Treatment was given by intraperitoneal route over a period of 8 consecutive days.

As in the previous trials, the animals were divided into batches of 10 and pyrimethamine was used as reference product. Results were evaluated by the parasite-level in the blood and by the number of deaths.

In the preventive tests, the compound under study or the pyrimethamine were injected 2 days after administration of the infective dose.

In the curative tests, the injections were given 7 days after administration of the infective dose. In this latter test, all the treated chicks and the surviving controls were reinfected by a fresh intramuscular injection of the plasmodium on the twenty-seventh day and results were again evaluated, this time on the eleventh day, in terms of the parasite-level in the blood and by the number of deaths.

The results obtained with pyrimethamine and B 8370 are given in the following tables:

| | Controls | Preventive treatment | | | |
|---|---|---|---|---|---|
| | | Pyrimethamine | | B 8370 | |
| | | 0.25 mg./kg. | 0.50 mg./kg. | 0.50 mg./kg. | 1 mg./kg. |
| Parasite Blood Level | 10/10 by seventh day after infection | | 0 after 20 days | | 0 after 20 days |
| Deaths | 6/10 by fifteenth day | | | | |
| | 6/10 by twenty-eighth day | 0 after 28 days | 0 after 28 days | 0 after 28 days | 0 after 28 days |

| | Controls | Curative treatment | | | |
|---|---|---|---|---|---|
| | | Pyrimethamine | | B 8370 | |
| | | 0.50 mg./kg. | 2.5 mg./kg. | 1 mg./kg. | 5 mg./kg. |
| Parasite Blood Level | 10/10 by seventh day | 10/10 after 7 days | 10/10 after 7 days | 10/10 after 7 days | 10/10 after 7 days |
| | | 0/10 after 15 days | 0/10 after 15 days | 0/10 after 15 days | 0/10 after 15 days |
| | | 10/10 after 22 days | 0/10 after 22 days | 0/10 after 22 days | 0/10 after 22 days |

| | Controls | Preventive treatment Pyrimethamine | | B 8370 | |
|---|---|---|---|---|---|
| | | 0.25 mg./kg. | 0.50 mg./kg. | 0.50 mg./kg. | 1 mg./kg. |
| Deaths | 4/10 by twenty-seventh day | 10/10 after 27 days 0 after 27 days | 10/10 after 27 days 0 after 27 days | 10/10 after 27 days 0 after 27 days | 0/10 after 27 days 0 after 27 days |
| | | REINFECTION | | | |
| Deaths | 6/6 by eleventh day after reinfection | 8/10 after 11 days (Parasitaemia in survivors) | 8/10 after 11 days (Parasitaemia in survivors) | 6/10 after 11 days (No parasitaemia in survivors) | 3/10 after 11 days (No parasitaemia in survivors) |

The same conclusions may be drawn as in the case of the tests on mice described above. B 8370 at a dose of 5 mg./kg. in curative treatment is more active than pyrimethamine base in an equimolar dose. On the twenty-seventh day no chicks showed any parasitaemia whereas with pyrimethamine base all the chicks had become reinfected. If relative toxicity values are taken into account the superiority of B 8370 is even more marked.

Antitoxoplasmic activity

The drugs which are normally employed for the treatment of toxoplasmosis are pyrimethamine, which is a very active agent in this indication, and certain sulphonamides such as sulphapyrazine. As indicated above, the use of pyrimethamine over prolonged periods involves the risk of undesirable side-effects. The use of the sulphonamides can also be accompanied by side-effects going as far as renal damage.

It is, therefore, most desirable that other agents be developed which, while possessing valuable antitoxoplasmic activity, do not present the inconvenience of producing undesirable side-effects when given over long periods of time.

The compounds of the invention are likely to provide such desirable replacement agents since it has been observed that they are endowed with marked antitoxoplasmic properties.

This antitoxoplasmic activity was evidenced in tests on mice infected with toxoplasma Gondii (Sabin Rh Strain). Fresh mice were inoculated intraperitoneally with 0.25 ml. of a suspension of ascites taken from a mouse inoculated three days before.

When untreated, the disease under these conditions develops as follows:
Either:
a. The animal quickly loses weight (25%), its fur becomes dull, the hairs stand on end and polypnoea appears. On the fourth day, the animal is adynamic and exhausted. It no longer takes any food or drink. Death generally occurs on the fifth day under conditions of complete exhaustion.
OR:
b. The animal retains its normal appearance, although with slight adynamia, and on the day following inoculation develops enormous ascites rich in toxoplasma. On the fifth day, respiration starts to be difficult but there is no marked emaciation. Towards the sixth day, the fur becomes dull and the animal takes no more nourishment. Death occurs between the sixth and seventh days.

As in previous trials, the compounds of the invention were compared with pyrimethamine base as reference product. All the products were given by oral route two days before inoculation with the parasite and then every day until the end of the experiment (forty-fifth day). The doses used were one-fifth of the $LD_{50}$ for pyrimethamine base and one-sixth of the MTD for the compounds of the invention. These doses were chosen because lower doses were found to be inactive under the experimental conditions employed. The mice used were of the Swiss strain and were divided into batches of 25.

The following table gives the results obtained with pyrimethamine and B 8370.

| No. of of after inoculation with parasite | Controls | Pyrimethamine base 25 mg./kg. | B 8370 500 mg./kg. |
|---|---|---|---|
| 4 | 5/25 | 0 | 0 |
| 5 | 16/25 | 0 | 0 |
| 6 | 25/25 | 1/25 | 0 |
| 8 | | 4/25 | 0 |
| 11 | | 8/25 | 0 |
| 13 | | 9/25 | 0 |
| 15 | | 10/25 | 0 |
| 17 | | 10/25 | 0 |
| 19 | | 13/25 | 0 |
| 20 | | 14/25 | 0 |
| 22 | | 15/25 | 0 |
| 23 | | 15/25 | 0 |
| 35 | | 15/25 | 0 |
| 41 | | 15/25 | 0 |
| 45 | | 15/25 | 0 |

These results show that, whereas all the control animals were dead by the sixth day and 60% of the pyrimethamine-treated animals were dead at the end of the experiment, all the mice treated with B 8370 survived.

Antiallergenic activity

The antiallergenic activity of the compounds of the invention were compared with that of pyrimethamine base by the classic test of pulmonary oedema produced by ovalbumin in the guinea-pig.

Four batches each of 8 male albino guinea-pigs weighing about 300 g. were used and the following procedure was adopted:

Batch No. 1: This was the control batch. Each animal received a daily intraperitoneal dose of 0.2 ml. of an isotonic solution of sodium chloride over a period of 15 days in order to place them in the same "psychological" condition as the treated animals.

Batch No. 2: Each animal of this batch received a daily intraperitoneal dose of 0.5 mg./kg. of pyrimethamine base over a period of 15 days.

Batch No. 3: Each animal received a daily intraperitoneal dose of 0.75 mg./kg. of B 8270 over a period of 15 days.

Batch No. 4: Each animal received a daily intraperitoneal dose of 1 mg./kg. of B 8370 over a period of 15 days.

On the first and second days following administration of the above-indicated doses, each batch was sensitized by means of an intraperitoneal injection of 0.2 ml. of a 2% aqueous solution of ovalbumin per 300 g. of body-weight.

The shock was triggered-off on the fifteenth day by an intracardiac injection of 0.1 mg. of the same ovalbumin solution per 300 g. of body-weight.

The results obtained are given in the following table:

| Batch | Number of animals exposed to test | Number of animals having undergone fatal shock |
|---|---|---|
| Controls | 8 | 8 |
| Pyrimethamine base | 6 | 3 |
| B 8270 | (2 dead during sensitization period) 7 | 2 |
| B 8370 | (1 dead during sensitization period) 8 | 2 |

These figures show that the compounds of the invention possess a higher degree of antiallergenic activity than pyrimethamine.

It will be appreciated that for therapeutic use the compounds of the invention will normally be administered in the form of a pharmaceutical or veterinary composition, which may be in a dosage unit form appropriate to the desired mode of administration, for example a coated or uncoated tablet, a powder, a capsule or a syrup containing from 100 to 500 mg of active substance for oral administration or a suppository for rectal administration.

Irrespective of the form which the composition takes, the pharmacetical or veterinary composition will normally comprise at least one of the compounds of the formula I or a pharmaceutically acceptable salt thereof, in association with a pharmaceutical carrier therefor. The carrier may be a solid or liquid diluent or excipient of the kind normally employed in the production of medicaments ready for use such as, for example, at least one ingredient selected from amongst the following substances: talc, magnesium stearate, milk sugar, saccharose, carboxymethylcellulose, starches, kaolin, levulite, cocoa butter.

The following Examples illustrate the invention.

EXAMPLE 1

Preparation of 2-dipropylacetamido-4-amino-5-p-chlorophenyl-6-ethyl-pyrimidine

In a one-litre flask were placed 149 g. of pyrimethamine and 500 g. of pyridine. The mixture was heated to 95°C., when a homogeneous solution was obtained, and, at the same temperature, 40.5 g. of dipropylacetyl chloride were added. The addition lasted for about 45 minutes after which the reaction medium was maintained at 95°C. for 1 hour. The mixture so obtained was cooled to 20°C. and the resulting precipitate of pyrimethamine hydrochloride was filtered out. The filtrates were collected and heated at 60°C. under 25 mm.Hg. to obtain an oily product. This oil was taken up under reflux in 200 g. of ethanol and the solution so obtained was introduced into a mixture of 200 g. of ethanol and 250 g. of demineralized water. The solution was allowed to stand for 12 hours at 0°C. and the precipitate which formed was washed first with 250 g. of a 10% acetic acid solution and then with demineralized water to neutrality. The precipitate was dried under vacuum in a drying-oven at 70°C. to constant weight (about 12 hours). In this manner, 43.5 g. of crude product were obtained, which represents a yield of 46.5% when calculated from pyrimethamine. This crude product was dissolved, while being stirred and refluxed, in a mixture of 280 g. of heptane and 40 g. of toluene in the presence of 4.5 g. of activated charcoal. The mixture was maintained under reflux for 30 minutes then the charcoal was removed by filtration. The filtrate was cooled at −10°C. for 4 hours and the precipitate which formed was then filtered over fritted glass and dried under vacuum in a drying-oven at 60°C. to constant weight. After this first purification, 34 g. of the desired product were obtained which were taken up under reflux in 240 g. of ethanol in the presence of 1.5 g. of activated charcoal. The charcoal was filtered off and the filtrate was concentrated under vacuum to about 100 ml. and cooled to 0°C. for 12 hours. The precipitate so obtained was filtered off, rinsed with 10 g. of iced ethanol and then dried under vacuum in a drying-oven at 60°C. to constant weight. By this procedure, there were obtained 31.5 g. of 2-dipropylacetamido -4-amino-5-p-chlorophenyl-6-ethyl-pyrimidine, m.p. 172°C., representing a yield of 73%.

EXAMPLE 2

Preparation of 2,4-bis-dipropylacetamido-5-p-chlorophenyl-6-ethyl-pyrimidine

Form X

In a 250 ml. two-necked flask fitted with a condenser and mechanical stirrer, were introduced 47.6 g. (0.19 mol) of pyrimethamine and 121.6 g. (0.45 mol) of dipropylacetic anhydride. The mixture was heated while being vigorously stirred at 150°C. for three-and-a-half hours. The dipropylacetic acid which formed as well as the dipropylacetic anhydride in excess were distilled off under vacuum (0.2 mm.Hg.). In this manner, 58 g. of a mixture which distilled at 90° - 94°C. under 0.2 mm.Hg were obtained. The warm residue was taken up in 200 ml. of heptane. The solution was then placed for about 10 hours in a refrigerator and the crystals so obtained were centrifuged out and washed twice with iced heptane. After drying, there were obtained 82.6 g. of pure 2,4-bis-dipropylacetamido-5-p-chlorophenyl-6-ethyl-pyrimidine (form X), m.p. 113° - 114°C., representing a yield of 87%.

The free base obtained in this manner was converted respectively to its hydrochloride, oxalate and dimethane-sulphonate as hereinafter described.

Monohydrochloride

To an ethereal solution of 2,4-bis-dipropylacetamido-5-p-chlorophenyl-6-ethyl-pyrimidine (form X) was added a solution of hydrochloric acid in ether (1 mol of the free base to 1 mol of hydrochloric acid). The 2,4-bis-dipropylacetamido-5-p- chlorophenyl-6-ethyl pyrimidine (form X) monohydrochloride so formed had a m.p. of 119° – 121°C. when crystallised from isopropyl ether.

Monooxalate

To an ethereal solution of the free base previously obtained was added a solution of oxalic acid in ether (1 mol of free base to 1 mol of oxalic acid). The 2,4-bis-dipropylacetamido-5-p-chlorophenyl-6-ethyl pyrimidine (form X) monooxalate so formed was then crystallised from isopropanol.

Dimethanesulphonate

To an ethereal solution of free base previously obtained was added methanesulphonic acid. The 2,4-bis-dipropylacetamido-5-p-chlorophenyl-6-ethyl-pyrimidine (form X) dimethanesulphonate so formed had a m.p. of 84.5°C. when crystallized from isopropyl ether.

Form W 2,4-bis-dipropylacetamido-5-p-chlorophenyl-6-ethyl-pyrimidine (form W) was prepared by the same procedure as that described for "form X" but with pentane in place of heptane as solvent. The product had a m.p. of 89°C.

Form Y 5 g. of 2,4-bis-dipropylacetamido-5-p-chlorophenyl-6-ethyl-pyrimidine (form W or X) were progressively heated to 140°C. in 5 ml. of white petroleum spirit. By slow cooling, 2 g. of 2,4-bis-dipropylacetamido-5-p-chlorophenyl-6-ethyl-pyrimidine (form Y) were obtained, m.p. 121°C., representing a yield of 40%.

EXAMPLE 3

Preparation of 2,4-bis-(2-ethyl-2-butyl-acetamido)-5-p-chlorophenyl-6-ethyl-pyrimidine dimethanesulphonate In a 100 ml. two-necked flask fitted with a condenser and a mechanical stirrer, were introduced 12.5 g. (0.05 mol) of pyrimethamine and 29.7 g. (0.11 mol) of 2-ethyl-hexanoic anhydride. The mixture was heated for 3.5 hours at 150°C. after which the 2-ethyl-hexanoic acid which formed and the 2-ethylhexanoic anhydride in excess were distilled off under vacuum. The oily residue was dissolved in 100 ml. of hexane and the solution was then placed in a refrigerator. The crystals formed, which were nearly pure, were then centrifuged out, washed and dried. In this manner 18 g. (yield: 72%) of the desired product were obtained, the product then being recrystallised first from 70 ml. of pentane and then from 30 ml. of hexane.

By this procedure, 8.5 g. of pure 2,4-bis-(2-ethyl-2-butylacetamido)-5-p-chlorophenyl-6-ethyl-pyrimidine in free base form were obtained, representing a yield of 34% after purification. The product had a m.p. of 48.4°C.

250 mg. of the free base previously obtained were dissolved in 1 ml. of hexane. This solution was added to 120 mg. of methanesulphonic acid dissolved in 1 ml. of ether. The oil so obtained was taken up several times in hexane. 10 ml. of ether were then added to the solution and crystals precipitated which were centrifuged out and dried.

By this method, there were obtained 300 mg. of 2,4-bis-(2-ethyl-2-butyl-acetamido)-5-p-chlorophenyl-6-ethylpyrimidine dimethanesulphonate, m.p. 73.3°C.

EXAMPLE 4

Preparation of 2,4-bis-tripropylacetamido-5-p-chlorophenyl-6-ethyl-pyrimidine

In a 50 ml. two-necked flask fitted with a condenser and a mechanical stirrer were introduced 2.25 g. (0.009 mol) of pyrimethamine and 7.25 g. (0.0204 mol) of tripropylacetic anhydride. The mixture was then heated at 170°C. for 24 hours. After cooling, the oil so obtained was chromatographed on an alumina column and eluted twice with 250 ml. of ether containing 2% chloroform. The solvents were distilled off under vacuum and a brownish oil was obtained which crystallised slowly from pentane. The crystals formed were centrifuged out and recrystallised from 15 ml. of hexane. By this procedure, 1.10 g. of pure 2,4-bis-tripropylacetamido-5-p-chlorophenyl-6-ethyl-pyrmidine were obtained, representing a yield of 21%. The product had a m.p. of 117.4°C.

We claim:

1. A pyrimidine compound of the formula:

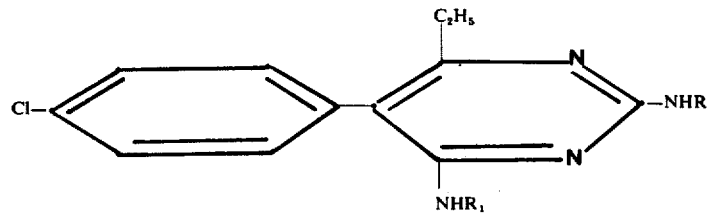

or a pharmaceutically acceptable single (mono) and double (di) acid addition salt thereof, wherein R represents dipropylacetyl, tripropylacetyl, 2-ethyl-2-butylacetyl or 2-methyl-2-pentyl-acetyl and $R_1$ represents hydrogen or dipropylacetyl, tripropylacetyl, 2-ethyl-2-butyl-acetyl or 2-methyl-2-pentyl-acetyl.

2. 2-Dipropylacetamido-4-amino-5-p-chlorophenyl-6-ethyl-pyrimidine or a pharmaceutically acceptable single (mono or double (di) acid addition salt thereof.

3. 2,4-Bis-dipropylacetamido-5-p-chlorophenyl-6-ethyl-pyrimidine or a pharmaceutically acceptable single (mono) or double (di) acid addition salt thereof.

4. A compound as defined by claim 1 wherein R and R' are 2-ethyl-2-butylacetyl groups.

5. A compound as defined by claim 1 wherein R and R' are tripropylacetyl groups.

* * * * *